US005338015A

United States Patent [19]

Liegel et al.

[11] Patent Number: 5,338,015

[45] Date of Patent: Aug. 16, 1994

[54] LIFTING DEVICE INCLUDING A MULTIPLE-AXIS MOTION MODULE

[75] Inventors: Reinald D. Liegel; James Ballard; James C. Graham, all of Waukesha; Craig A. Wisner, Wauwatosa; Jeffrey V. Russell, Oconomowoc, all of Wis.

[73] Assignee: Hein-Werner Corporation, Waukesha, Wis.

[21] Appl. No.: 128,474

[22] Filed: Sep. 28, 1993

Related U.S. Application Data

[62] Division of Ser. No. 985,195, Dec. 3, 1992, Pat. No. 5,269,501.

[51] Int. Cl.[5] .............................................. B23Q 1/10

[52] U.S. Cl. ..................................... 269/71; 254/134; 269/76

[58] Field of Search ............................. 269/17, 76, 71; 254/134, 127, 89 H, 4 B, 8 B

[56] References Cited

U.S. PATENT DOCUMENTS

| | | | |
|---|---|---|---|
| 2,827,690 | 3/1958 | Brown | 269/71 |
| 4,599,034 | 7/1986 | Kennedy et al. | 269/71 |
| 5,033,717 | 7/1991 | Symon | 254/134 |
| 5,190,265 | 3/1993 | Barry et al. | 254/134 |

*Primary Examiner*—Timothy V. Eley
*Assistant Examiner*—David P. Bryant
*Attorney, Agent, or Firm*—James A. Wilke

[57] ABSTRACT

A multiple-axis motion module for holding a tool and providing an apparatus for moving such a tool about multiple-axis. The multiple-axis motion module is used in combination with a vehicle transportation system for moving, positioning and manipulating vehicles and vehicle parts.

4 Claims, 11 Drawing Sheets

5
22
110
112
113
114
116
117
118
119
120
121
122
123
130
132
134
136
138
140
141

200
205
206
208
210
212
214
216
218
219
220
222
170
182
260
261
262
263
264
266
268
269
270
271
272
274
276
277
245
5
22
166

LIFTING DEVICE INCLUDING A MULTIPLE-AXIS MOTION MODULE

This is a divisional of U.S. Ser. No. 07/985,195 filed on Dec. 3, 1992, now U.S. Pat. No. 5,269,501.

FIELD OF THE INVENTION

The present invention relates to the vehicle repair field and particularly to a system for moving, positioning and manipulating a vehicle and vehicle parts in a vehicle repair facility primarily when the vehicle is damaged or in need of repairs.

BACKGROUND OF THE INVENTION

In the vehicle repair business, a damaged or in-need-of-repair vehicle is usually brought to a vehicle body shop or the like for corrective measures.

In some cases the vehicle can be driven under its own motive power or in some cases can be pushed or pulled to the repair station by some motive engine. If one or more of the vehicle's wheel/tire sets is damaged or removed during the repair process, motion from one position to another is difficult at best and usually requires some sort of lifting device, such as a lift truck, crane or derrick. Maneuverability becomes more complicated as the proximity of vehicles to each other or proximity of vehicles to buildings or repair racks becomes smaller, i.e. closer together. During the repair process, various vehicle parts must be moved to or from vehicles. In addition, some vehicle parts must be held in position during the repair process and in some cases, the parts must be manipulated or moved during the repair process, such as to align with mounting holes or with other parts.

Vehicle body parts, especially in modern vehicles, come in different shapes and sizes. Some vehicle parts are heavy or delicate. At times, the vehicle being worked on is positioned on another device, such as a repair rack or a vehicle lift. A vehicle repair shop operator may need several persons to move, manipulate and hold vehicle parts because of characteristics herein mentioned.

Various devices have been developed that address these and other problems.

Prior Art Devices

| INVENTOR | PAT. NO. | TITLE | PRIMARY DISCLOSED USE |
|---|---|---|---|
| Arakaki | 4,042,208 | Automobile bumper and door lifting and positioning assembly | Bumper/ Door |
| Coccaro | 4,690,609 | Apparatus for jacking and dollying an affixed vehicle wheel assembly | Wheel Dolly |
| Marek | 4,183,511 | Work holder for adjustable supporting a work piece | Vehicle doors |
| Shern | 4,810,151 | Door transporting and mounting machine | Door |
| Harlow | 3,964,729 | Elevating device for snowmobiles | |
| Branick | 2,669,422 | Bumper jack | Bumper Jack |
| Andrist, etal | 3,892,385 | Automobile tool | Vehicle Door |
| Browder, etal | 2,908,403 | Device for removing and installing automobile door | Vehicle Door |
| Wells | 3,220,565 | Bumper hoisting fixture attachment | Bumper Jack |
| Waldown | 3,858,864 | Vehicle door supporting apparatus | Vehicle Door |
| Mathers | 4,029,308 | Device particularily suited for use in handling hoods of motorized vehicles | Vehicle Hood |
| Bork | 4,530,492 | Apparatus for supporting vehicle body parts | Vehicle Parts |
| Cushenbery | 4,180,252 | Vehicle door and bumper lift | Vehicle Bumper/ Door |
| Ballard | 5,076,448 | Portable hydraulic crane | Crane |
| Eck | 4,555,089 | Wheel lift device | Wheel Lift |
| Christiansen | 3,765,667 | Engine stand | Engine Stand |
| Butorac | 3,807,694 | Vehicle service jack | Vehicle Jack |
| Eck, Liegel etal | 4,886,242 | Pneumatic hydraulic side lifting jack | Vehicle Lift |
| Fjellstrom | 4,932,639 | Door and body jack | Vehicle Door & |

The applicant's assignee and such assignee's successor is the owner of several patents for such devices like U.S. Pat. 3,765,667, 3,807,694, 4,555,089, 4,886,242 and 5,076,448. The '089 device describes a wheel lift device for raising and supporting a wheeled vehicle but can only be used by approaching the vehicle's wheel along its path of roll, i.e. from a front or rear end of the vehicle. That device is limited to use with the tire on the vehicle's wheel and cannot be used as a vehicle support during a frame straightening operation. The '448 device is a portable hydraulic crane used for various lifting operations in a vehicle maintenance and repair application.

The '667 device is an engine stand used for holding an engine at a comfortable height during a repair procedure. Such engine stand usually is on a wheeled stand for movement to and from the vehicle. The '694 device is a vehicle service jack used for lifting, within rated load capacity, various portions of a vehicle or similar items. The '242 device is a pneumatic hydraulic side lifting jack that is used to lift a side of a vehicle at locations specified by the vehicle manufacturer.

A body shop owner/operator usually would have to own a multitude-of such devices described above in order to perform maintenance and repair work on a vehicle. In addition, such body shop owner/operator would need bottle jacks, transmission jacks, vehicle stands and various other apparatus to perform his work on vehicles. None of these devices can be used or easily adapted to perform tasks for which they were not originally designed. As vehicles, particularily automobiles, evolve and new materials are used on such vehicles, devices have to be developed to handle and move more such items. Recent automobiles for instance have lower silhouettes with plastic and aluminum parts which restrict the operation and ability to use the current lifting device without structual damage to the automobile and its components. A body shop owner/operator may not be able to hire an additional person to assist in performing such operations or alternatively may have to hire an additional person in order to be able to obtain such repair work in the first instance. To avoid having to hire a person, a body shop owner/operator may buy a specialized device designed to perform a specific operation as described above. Ownership of each device constitutes, in total, a substantial investment in money. Such devices require substantial floor space either while in use or while being stored. Also, if one of the devices is being used on one vehicle, it cannot be used on another vehicle.

SUMMARY OF THE INVENTION

The present invention provides a unique transportation system used for moving, positioning and manipulating a vehicle and vehicle parts primarily when a vehicle is damaged or in the need of repairs. The transportation system includes various, separate modules, tools and apparatus that can be used individually or in association with each other to facilitate the various operations encountered in a vehicle repair and service operation.

The principal apparatus in this system is a power module having interchangeable legs and parts that allow the power module to be reconfigured as to its height, width and length. The ability to be reconfigured is a unique feature of the present invention in that as the job requirements and stability conditions change, the present invention can be adapted to meet those conditions or requirements. The present invention can become a different tool as required or desired by the operator by simply adding or removing the various separate means for performing a specific operation, which applicant herein refers to as a module. Each specific module provides the necessary lifting and motive force apparatus and means for maneuvering the tool attachment for performing the necessary operation. The power module can also be reconfigured for its off-floor storage. One advantage of the reconfigurability of the power module is that it can be easily maneuvered between vehicle repair bays or stations and around the vehicle to be repaired.

The power module, as part of the system, can be provided with a motive device such as an electric motor to provide non-manual motive force to the power module. The power module is also provided with a force applying means for lifting. Such means can be attached to a tool support plate by means of a flexible member. Such force applying means or power means can be a ram and hydraulic cylinder, well known in the industry, powered by an electric, manual handle, air or hydraulic pump. One embodiment of the means for applying a force in the present invention uses a manual/electric hydraulic pump in a closed hydraulic circuit with a single fluid reservoir that allows the operator of the present invention to selectively operate the means for applying a force by the manual handle or the electric motor. The force applying means is attached to a lifting plate slidably mounted on the upright columns of the power module and adaptable to mount various attachments tools and modules of this transportation system. This system provides an economical and very flexible vehicle and vehicle parts transportation system.

A multiple-axis motion module, when used with the present invention system, provides a means for manipulating and positioning various tools attached to said motion module. The tools so attached to the motion module hold or act on various vehicle parts during the repair and service of vehicles. The tool mounting collar, attached to the motion module, can be rotated through an arc of at least sixty degrees and such tool mounting collar can be moved vertically through an arc of at least fifteen degrees. Such multiple-axis motion is accomplished by a screw means mounted on the motion module. Such screw means allows fine adjustment of the tool mounted in the tool collar.

Other principal features and advantages of the present invention will become apparent to those skilled in the art upon review of the following drawings, the detailed description and the appended claims.

BRIEF DESCRIPTION OF TEE DRAWINGS

FIG. 1 is a plan view of the posterior aspect of the power module.

FIG. 2 a sectional plan view of the power module through the section 2—2 shown in FIG. 1.

FIG. 3 is an isometric view of the power module.

FIG. 4 isometric view of the power module with its operative association with several tool modules.

FIG. **4*a*** is an isometric view of the material lift module.

FIG. **4*b*** is an isometric view of the side lift module in its low lift aspect.

FIG. **4*c*** is an isometric view of the side lift module in its high lift aspect.

FIG. **6*a*** is a sectional plan view of the support apparatus through section a—a and shows a tool installed in the adaptor plate tool collar.

Figures 7, 7A, 7B:
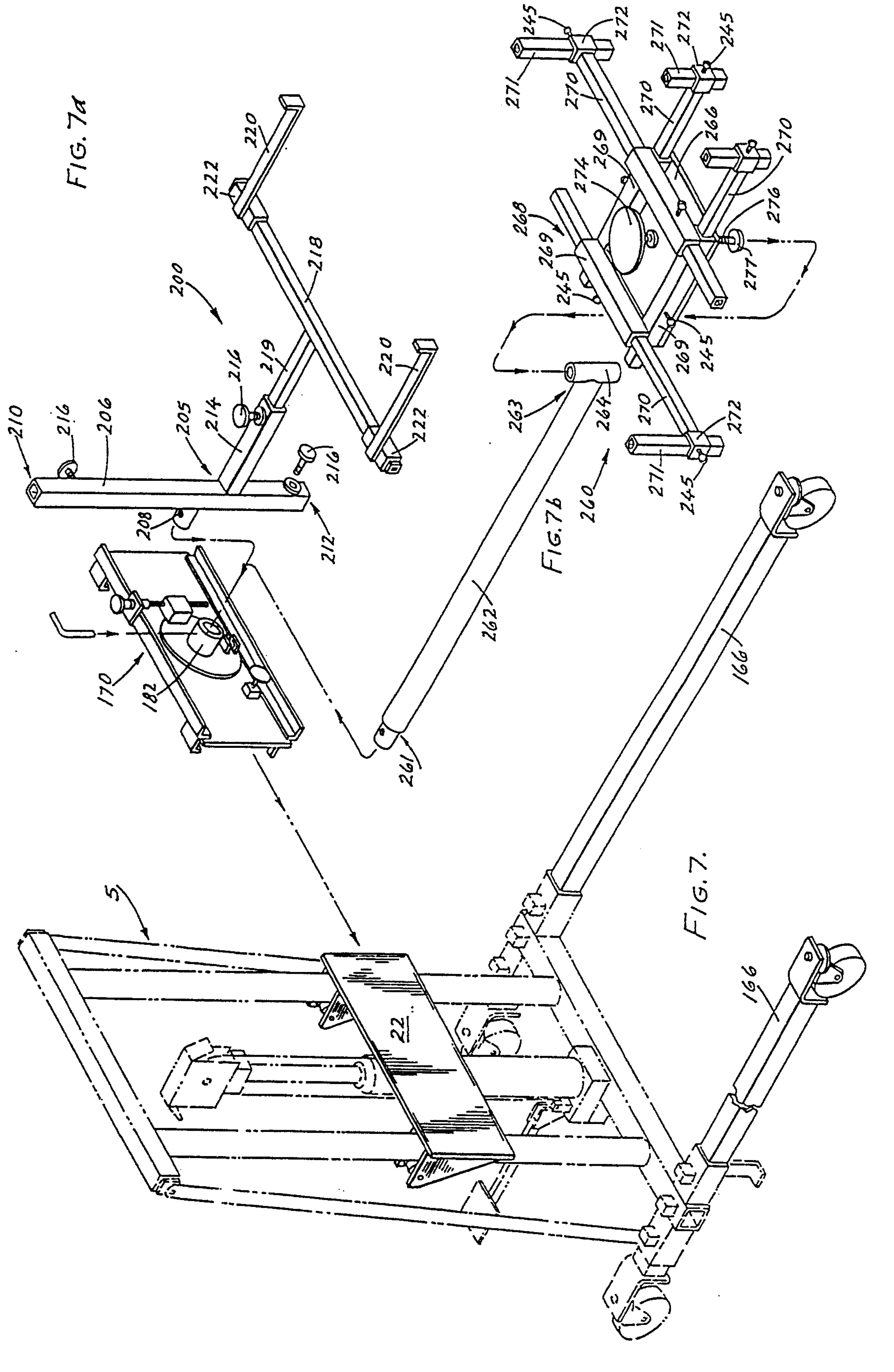

FIG. 7 is an isometric view of the power module showing long front wheel members for use with the crane module and the vehicle tank module.

FIG. **7*a*** is an isometric view of the vehicle frame horn module in association with the power module and the multiple-axis motion module.

FIG. **7*b*** is an isometric view of the vehicle tank module in association with the power module and the multiple-axis motion module.

Figure 8:
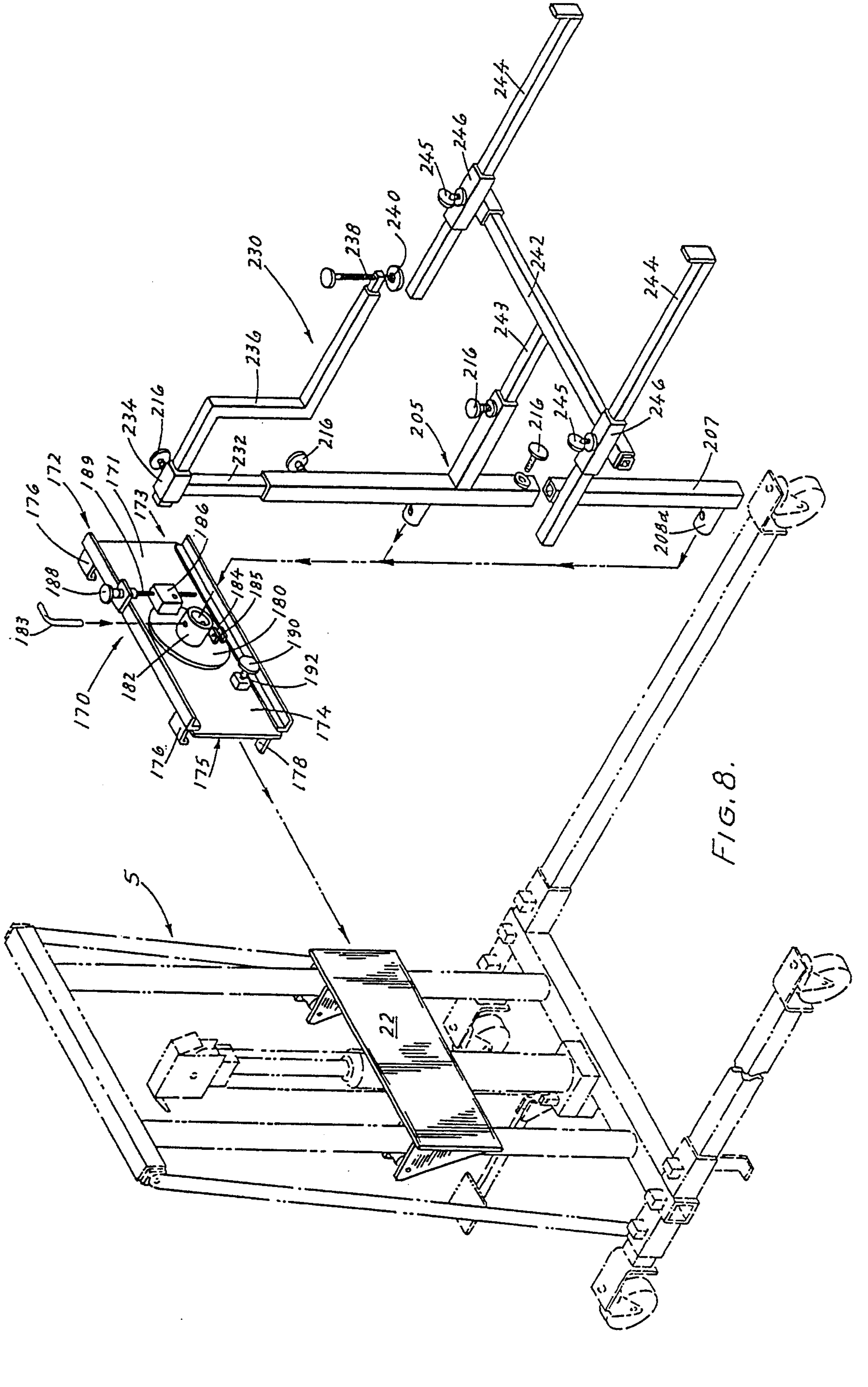

FIG. 8 is an isometric view of the bumper holder module in association with the power module and the multiple-axis motion module.

Figure 9:
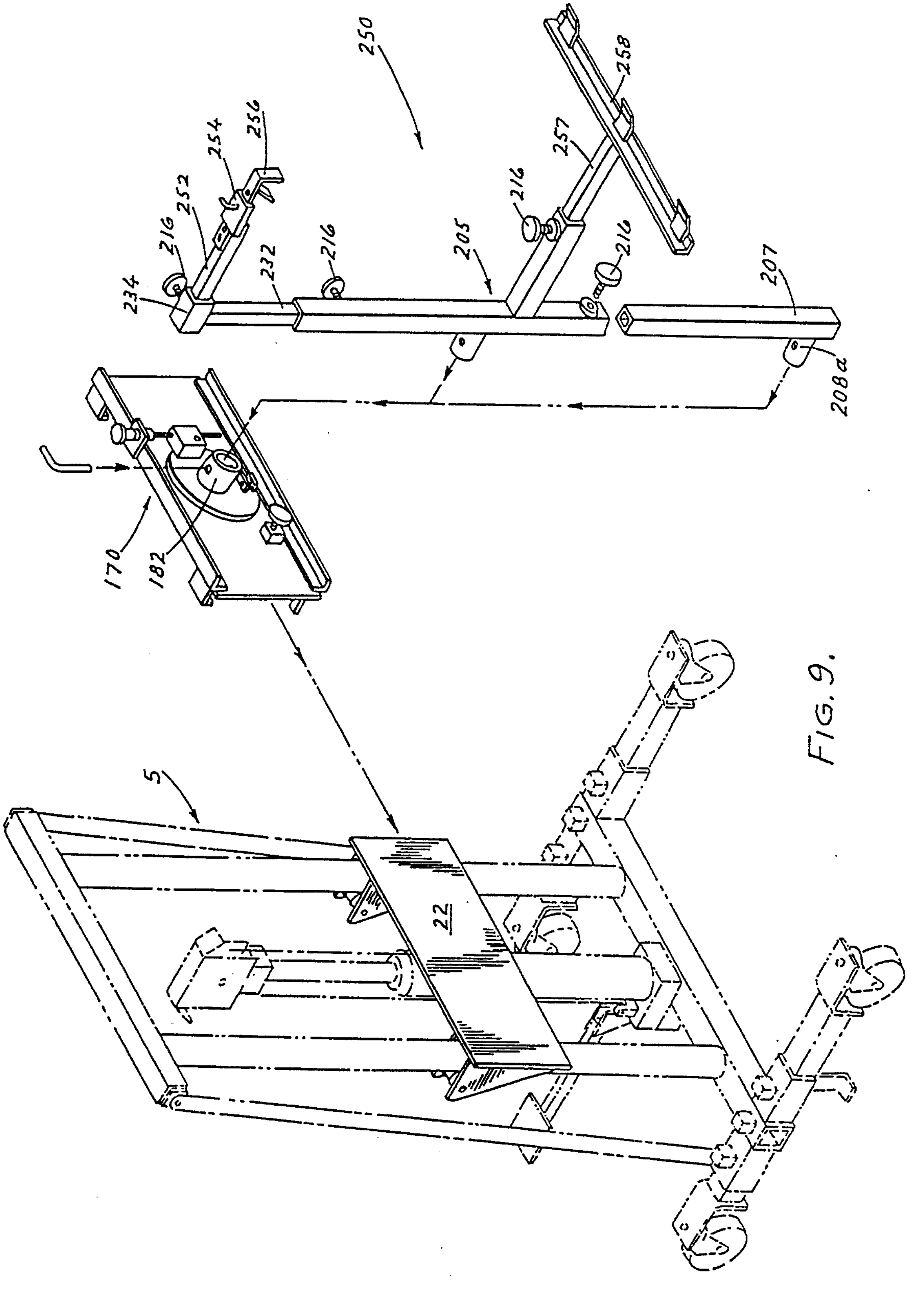

FIG. 9 is an isometric view of the door holder module in association with the power module and the multiple-axis motion module.

Figure 10:
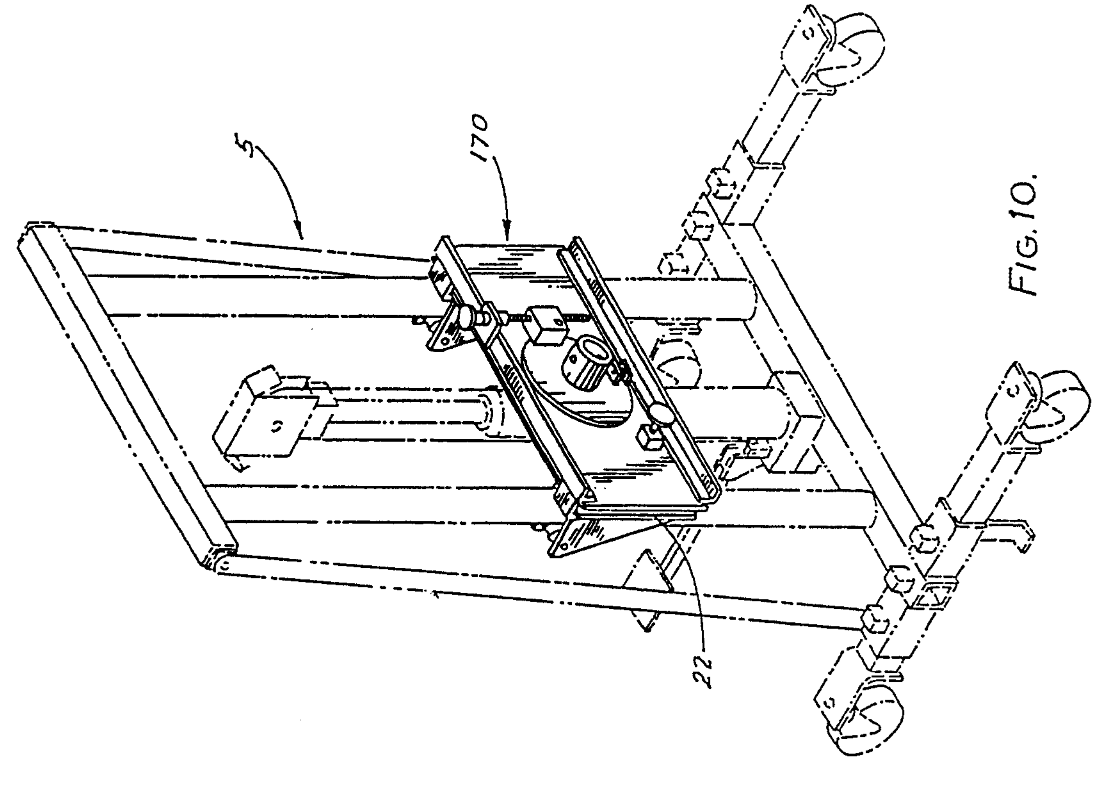

FIG. 10 is a isometric view of the multiple-axis motion module mounted on the tool support plate of the power module.

Figure 11:
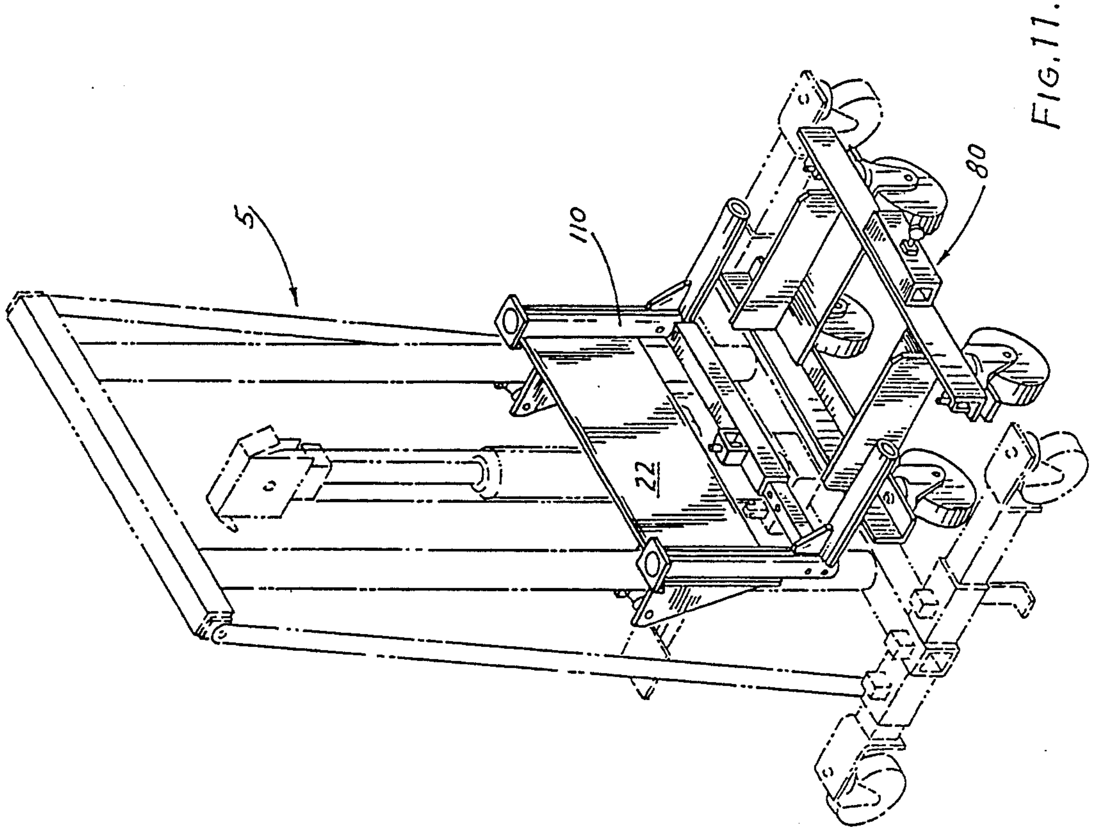

FIG. 11 is an isometric view of the operative association between the power module having the material lift module mounted on the tool support plate and the wheeled support apparatus.

Figure 12:
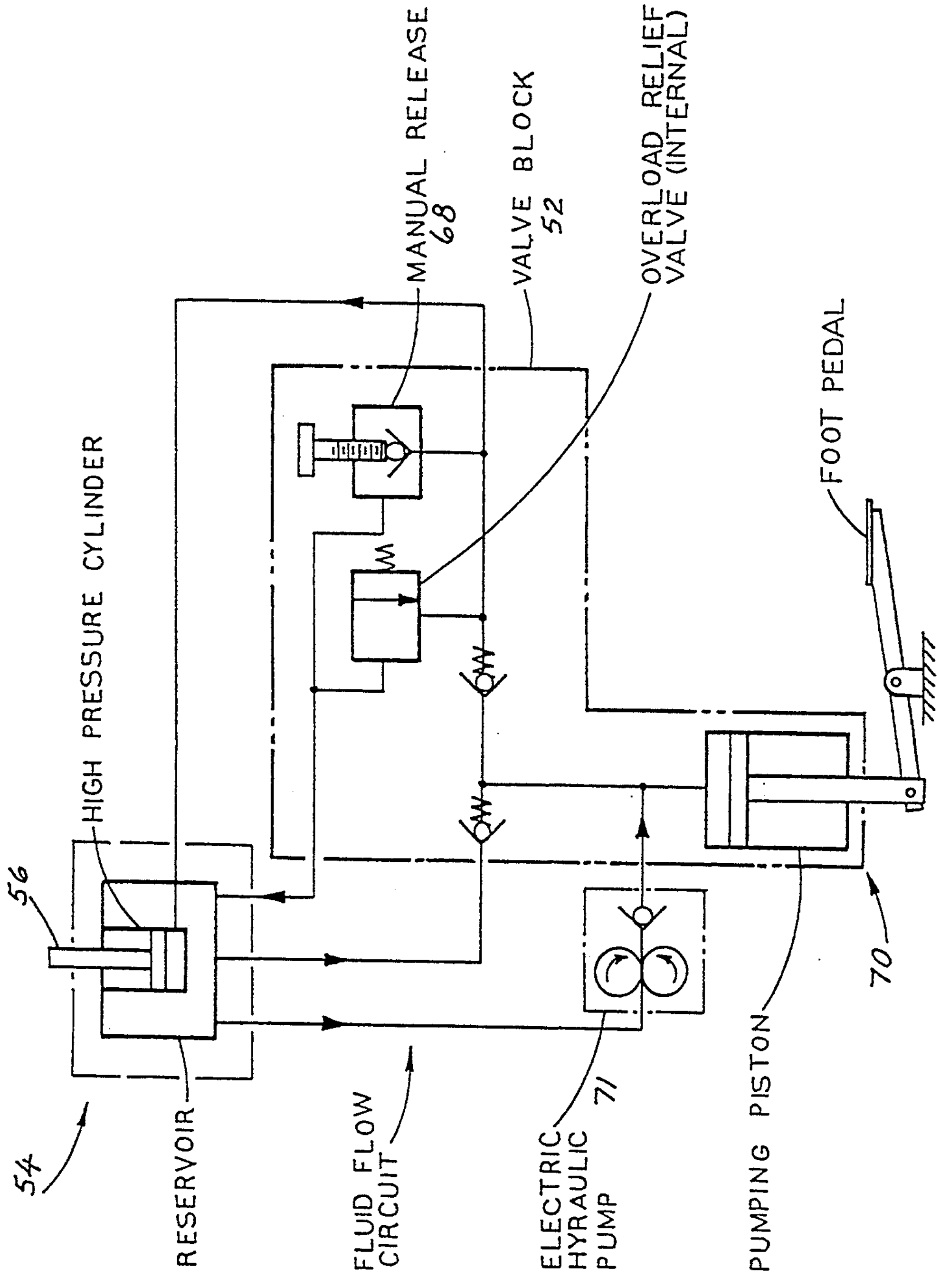

FIG. 12 is a schematic illustration of the manual/electric hydraulic pump circuit of the power means.

Before explaining the preferred embodiment of the invention in detail it is to be understood that the invention is not limited in its application to the details of construction and the arrangement of the components set forth in the following description as illustrated in the drawings. The invention is capable of other embodiments or being practiced or carried out in various ways, Also, it is to be understood that the phraseology and terminology employed herein is for the purpose of description and should not be regarded as limiting.

DETAILED DESCRIPTION OF PREFERRED EMBODIMENT

POWER MODULE

Figure 1:
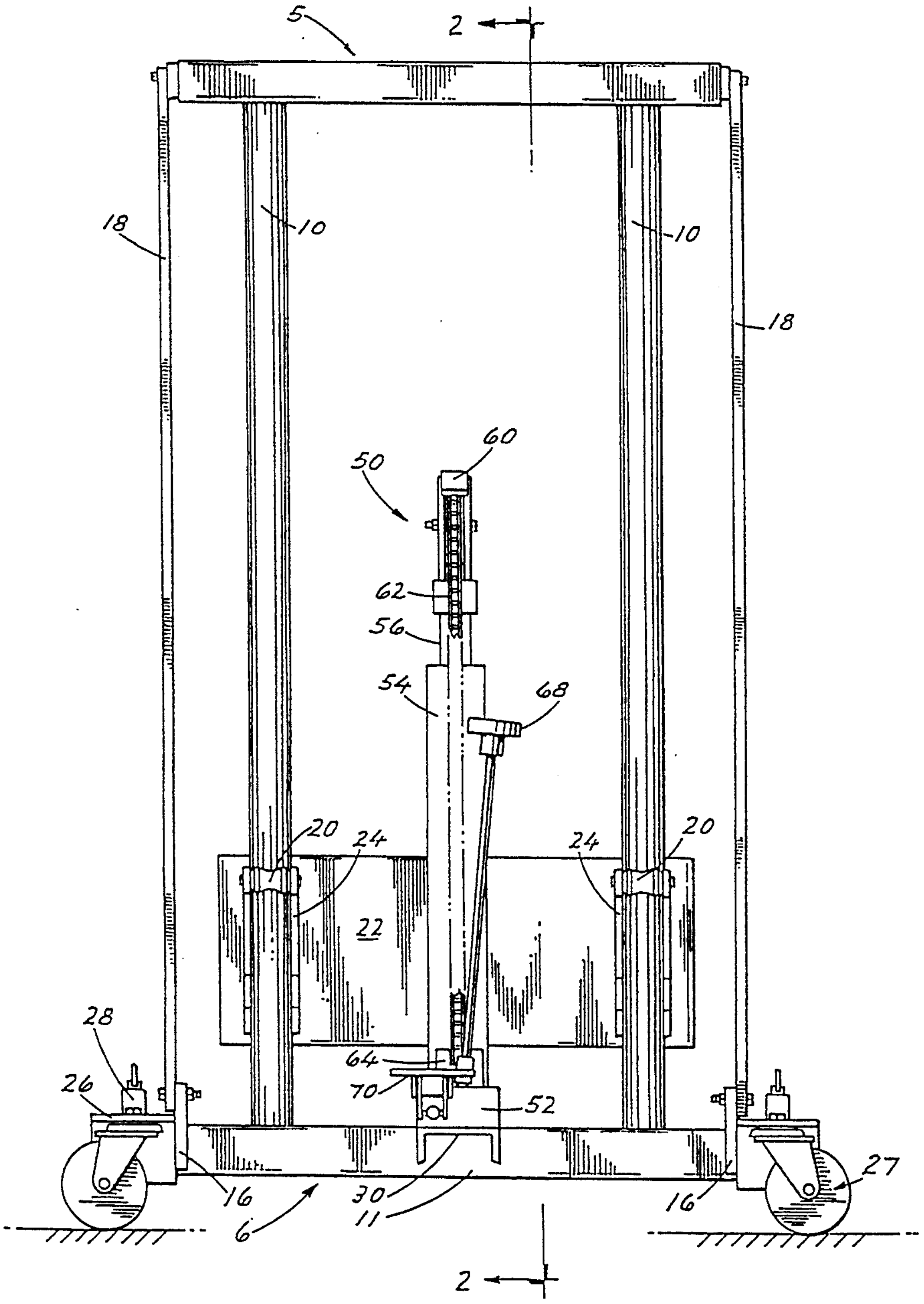
Figure 2:
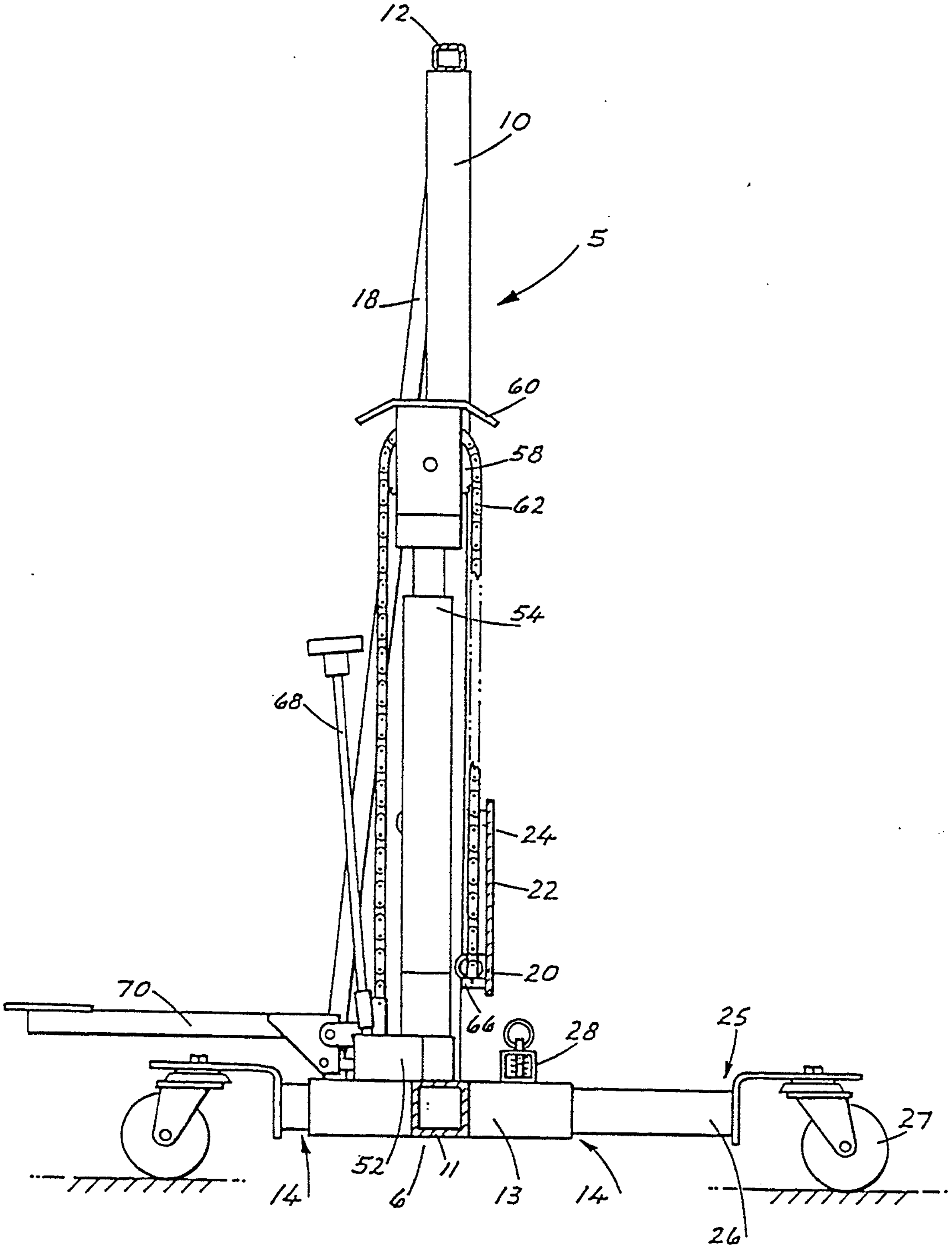
Figure 3:
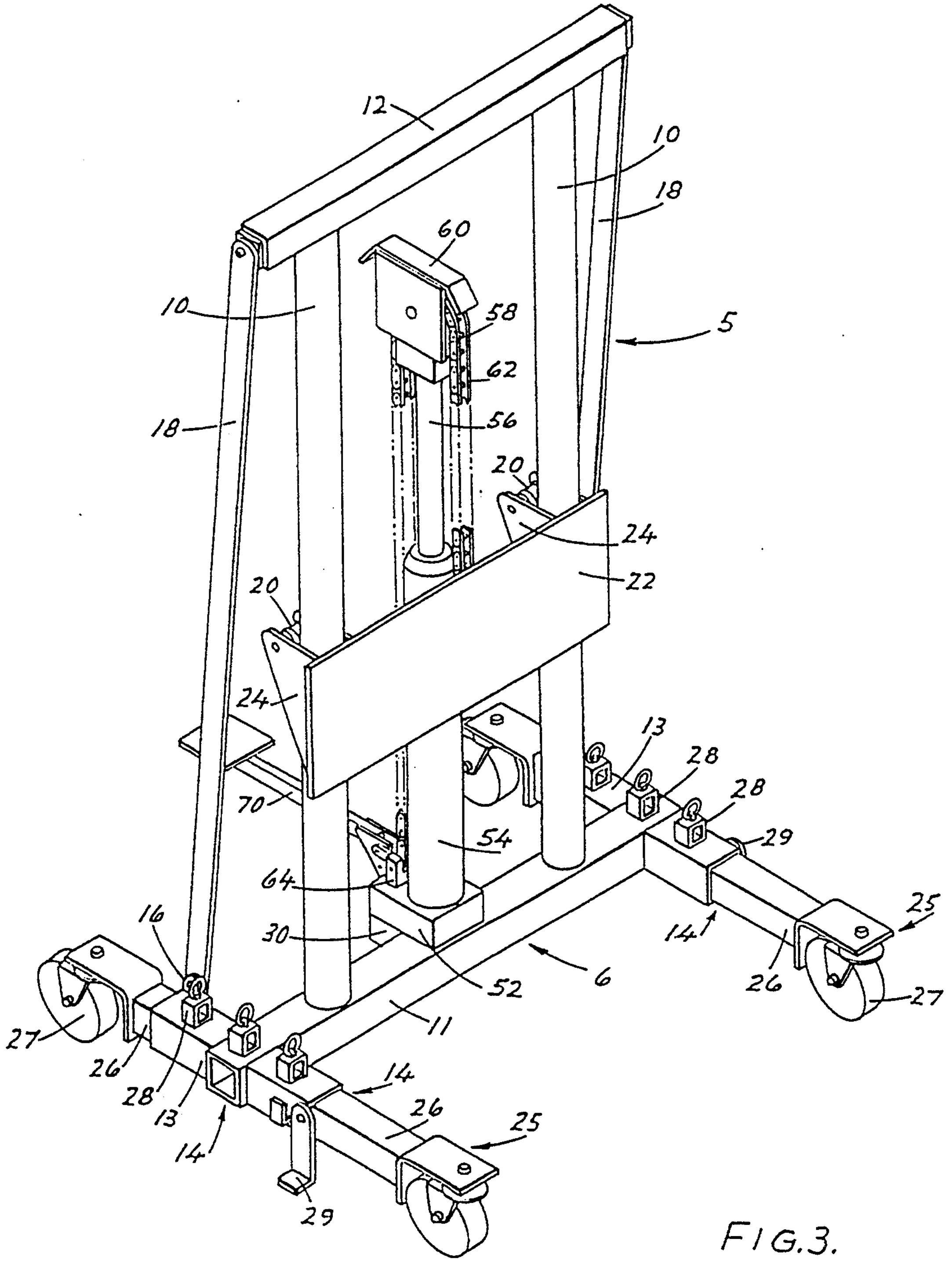

FIGS. 1, 2 and 3 shows the power module 5 which is the fundamental module of the present invention. The power module is the platform on which the other modules of the system are mounted and motivated.

The power module 5 includes a base member 6 supporting a pair of upright columns 10 which are maintained in a spaced apart relationship by a cross-beam 12. Each upright column 10 is further stabilized by a support strap 18 having two ends. One end is bolted to each end of the cross-beam 12 and the other end of the strap is bolted to a support bracket 16. The support bracket is mounted on the base member 6 outboard of the upright column 10. The support straps 18 are fastened by a convenient means such as welding or bolting, as shown in FIG. 1.

The base member 6 is further provided with a pair of leg support members 13, with each leg support member having a plurality of leg sockets 14. The leg socket 14 is adapted to receive a wheel member 25. The availability of a plurality of leg sockets, six in the illustrated construction, provides the operator with the opportunity to reconfigure the wheel member 25 for the power module 5 to accommodate the particular working conditions. The illustrated construction shows the base member 6 as a H-shaped frame formed by an elongated member 11 having a leg support member 13 attached to each end of said elongated member in a substantially perpendicular aspect. The base member 6, frame member 11 and 13 as illustrated, have a rectangular cross sectional configuration. To one skilled in the art, other types of frame members could be used and could be connected to form other configurations. The preferred embodiment for the wheel member 25 mounted in the leg socket 14 is to have two wheel members in the forward facing leg sockets 14 (as will be discussed below) and at least one other wheel member 25 in any other leg socket 14. For mobility purposes, without a load to support, a minimum of three wheel members is indicated. To assist in maintaining the power module 5 in a given location, the base member 6 may be provided with at least one floor lift member 29 pivotally mounted to said base member. To operate, the floor lift member is rotated about its pivot point from a stored position to a use position. The floor lift member 29 lifts the base member 6 a distance sufficient to raise one side of the base member 6 from the floor which allows the wheel members 25 to be changed. The operator reverses the sequence to lower the base member and re-establish floor contact with the wheel member. The preferred embodiment uses two floor lift members, one each mounted on each leg support member 13. The wheel member 25 includes a wheel mount 26 and a wheel 27. The wheel mount is adapted on one end to engage the leg socket 14 and to support a wheel 27 on the opposite end. In the preferred embodiment, the wheel is a caster to provide maximum maneuver-bility. The wheel mount 26 may be of convenient length and slidably engages the leg socket 14. The wheel mount is selectively secured in the leg socket by a means for locking 28 which in the illustration is a spring lock pin.

An essential part of the power module 5 is the tool support plate 22. The tool support plate 22 is adapted to engage the upright column 10 members by a means for rotatably engaging said column 10. Said means for rotatably engaging is a pair of column bearings 20 mounted between two brackets 24, which brackets are attached to the tool support plate proximate the edge of such plate and aligned to engage the upright column 10 between said column bearings 20 such that the column 10 is biased between the said bearings. The bearings 20 contact the upright column 10 and roll up and down on said column. The illustrated and preferred embodiment for the bearings includes a concave, cylindrical bearing surface adapted to have more than a tangential contact with the column 10. The tool support plate 22 preferably being a rectangular shaped member has the bracket 24 column bearing 20 assemblies attached to one of said plate's planar surfaces; with the other planar surface facing forward. The tool support plate 22 is attached to the power means 50 (described below) by a chain 62.

Two power modules 5 can be orientated so that the tool support plates 22 are in juxtaposition to each other. A separating adapter, at each of its ends, to engage a leg socket 14 is installed between the two power modules with one of said power module leg sockets 14 connected to each beam end. The system, with a side lift module 130 mounted on each tool support plate 22 of each power module 5, including adjustable arm brackets, is then a two-post lift for raising an entire vehicle. The two rear facing wheel member 25, of each power module, continue to allow portability of the two-post lift, however, the operator of the system may choose to remove such rear facing wheel member, thereby providing for a stationary two-post lift. The operator may also selectively install pads in the leg sockets instead of the wheel members.

POWER MEANS

The power module 5 is provided with a power means 50 which supplies the necessary lifting force to the several modules and tools attached and mounted on the tool support plate 22. The power means 50 includes a valve block 52 supported on the power module base member 6 by a shelf 30 attached to the elongated member 11 at the approximate midpoint between the spaced apart upright columns 10. Connected in flow communication with the valve block 52 is a hydraulic cylinder 54 containing a ram 56. Attached to the ram 56 is a pulley 58 having a pulley guard 60. The pulley 58 may be a channeled or a toothed type for engagement with the flexible member 62. The flexible member 62, which can be a link or leaf type chain, a strap, a belt or a cable (leaf chain is .illustrated), is attached at one of its ends 64 to the valve block 52 and its other end 66 to the tool support plate 22. An alternative embodiment of the power means 50 is to employ a telescoping hydraulic cylinder and ram (well known in the art) attached directly to the tool support plate. In operation, as the valve block 52 allows hydraulic fluid to enter the hydraulic cylinder 54, the ram 56 is pushed up out of the hydraulic cylinder 54. As the ram 56 pushes the pulley. 58 against the chain 62, the tool support plate 22 moves up the two upright columns 10 thereby moving any tool or module attached to said tool support plate. Hydraulic fluid is pumped through the valve block by a pump means, such as the manual pump pedal 70. Release flow control is provided by a manual valve means such as with valve handle 68. The hydraulic fluid can also be pumped by an electric hydraulic pump 71 in flow connection with the hydraulic fluid reservoir and the valve block. (See FIG. 12)

MATERIAL LIFT MODULE

Figures 4, 4A, 4B, 4C:
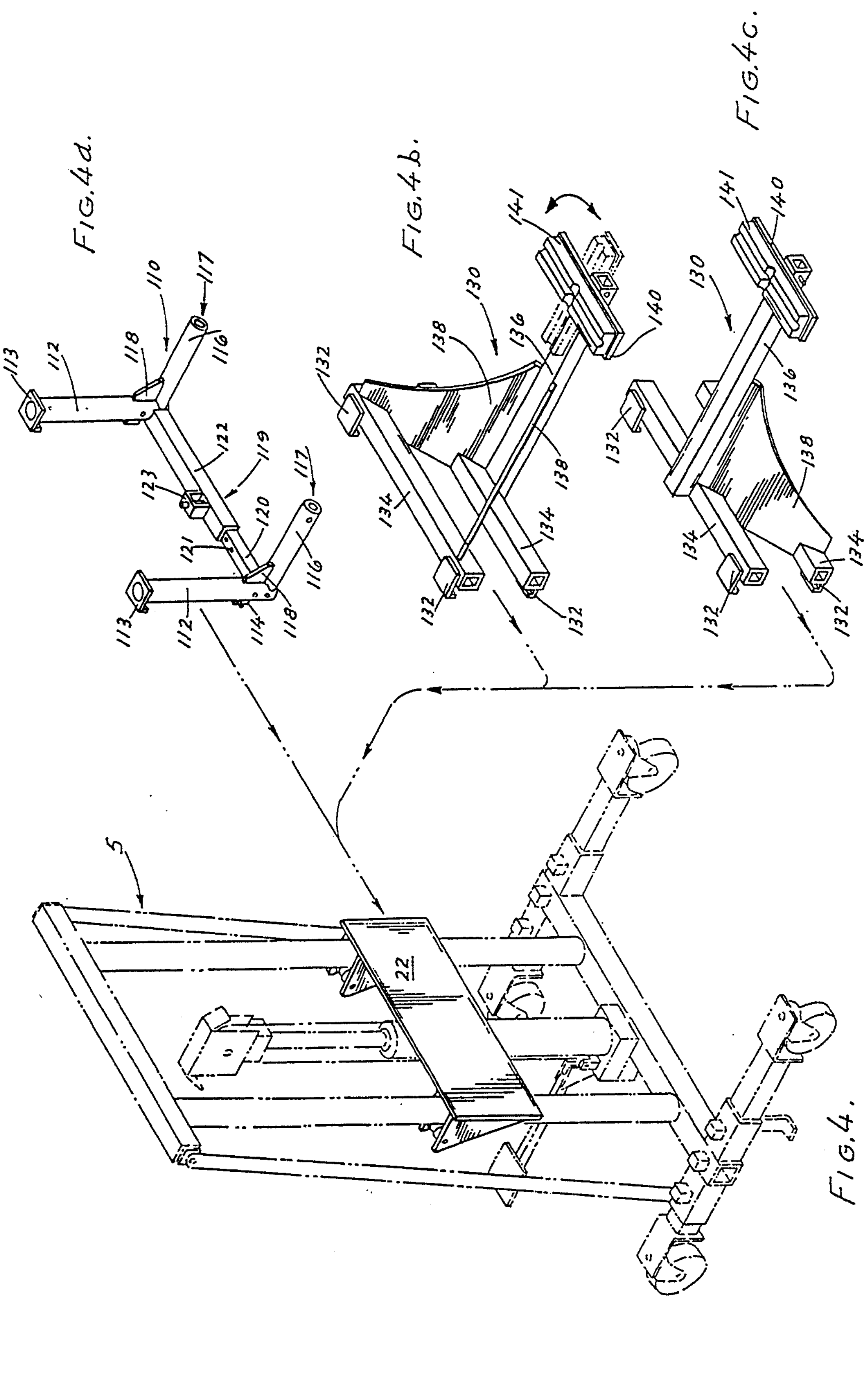

FIGS. 4 and 4*a* illustrates the power module 5 with its tool support plate 22 and the material lift module 110. The material lift module 110 includes a pair of vertical members 112 each having a mounting bracket 113 fixed to one end, the upper end, which bracket 113 engages the tool plate 22 of the power module 5. Each said vertical member is provided with a means for locking 114 attached near the lower end of said member and aligned to engage the tool support plate 22. The illustrated means for locking 114 is a cylinder spring lock. Attached to the lower end of each vertical member 112 is a horizontal member 116 maintained at a substantially right angle to said vertical member. The horizontal member is attached by welding or bolting or other suitable method. The end of each said horizontal member, opposite the attached end, may be provided with a socket 117. It should be noted that the illustrated horizontal members are of a tubular construction but that the horizontal member may also be a flat blade or fork construction. The vertical members 112 are maintained in a spaced apart relationship by a telescoping spacer tube 119 mounted between the said vertical members. Said telescoping spacer tube consists of a first telescoping member 120 which has a plurality of holes 121 with said first telescoping member 120 being fixed at one end to a vertical member 112. The telescoping spacer tube 119 further has a second telescoping member 122 which has a lock 123 mounted thereon with said second telescoping member 122 being fixed at one end to the other vertical member 112 in such an aspect as to allow the non-fixed end of such telescoping members 120 and 122 to slidably engage each other and be maintained at a selective position by the lock 123 engaging a hole 121 in 120 thereby maintaining the vertical members 112 in a spaced relationship.

In operation, the operator will select a distance between the vertical member 112 corresponding to the material the operator desires to engage and lift with the power module 5, for example a tire on a vehicle. If the operator installs the embodiment that has the flat blade type of horizontal member 116, the operator can lift a pallet or the like. After selecting the distance between the vertical members, the operator locks the telescoping spacer tube 119 with the lock 122 and installs the material lift module 110 on the tool support plate 22 of the power module 5 by engaging said support plate with the two brackets 113 of the lift module. As the power means 50 of the power module is operated, the tool support plate 22 raises or lowers the material lift module mounted thereon.

SUPPORT APPARATUS

Figure 6A:
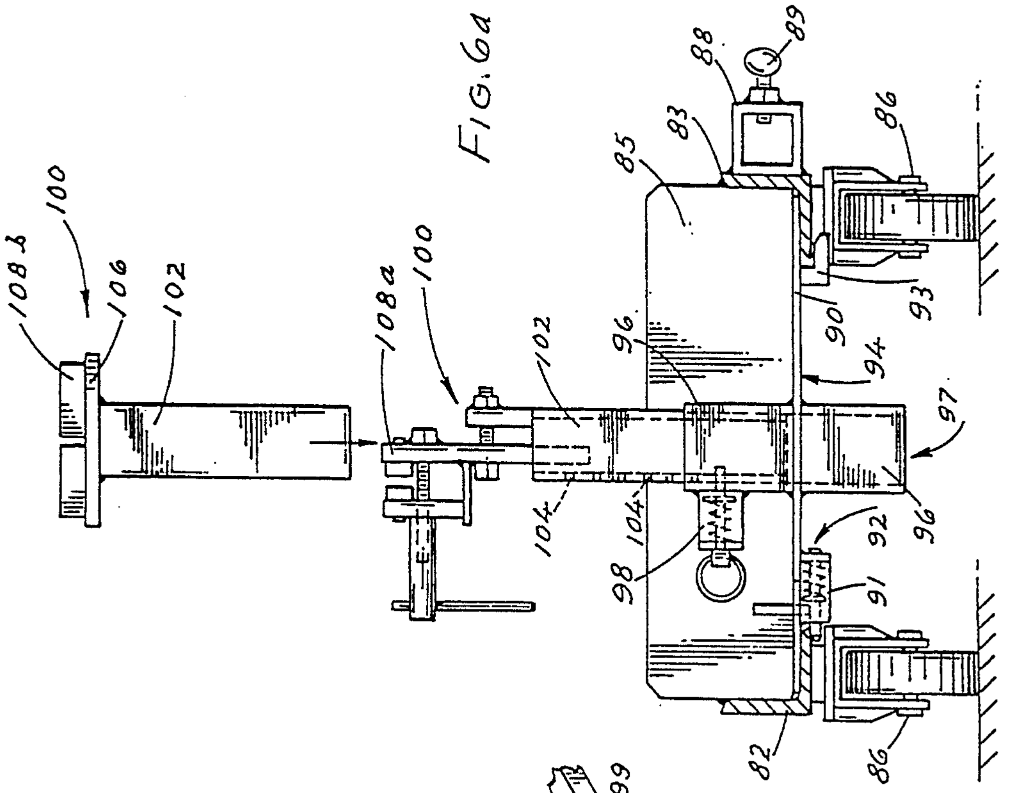
FIG. 6 is an isometric view of the support apparatus.
Figure 6:
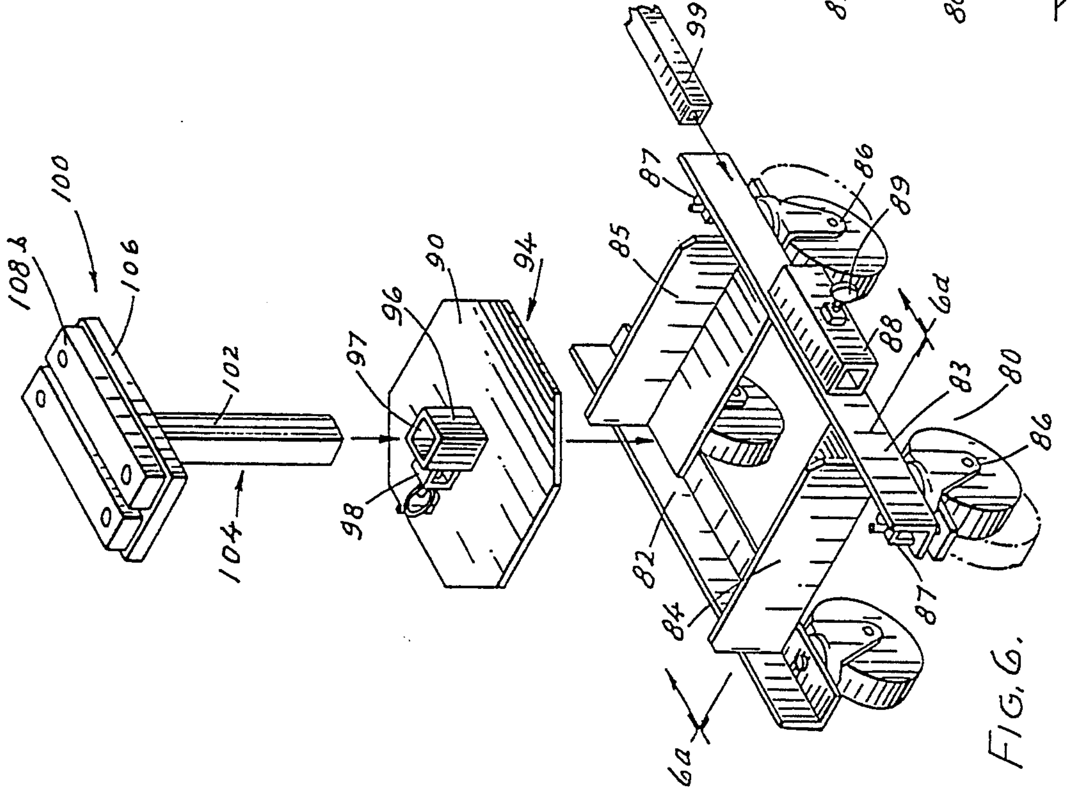

FIGS. 6, 6*a* and 11 illustrate a support apparatus 80 which is operatively associated with the power module 5. The support apparatus includes an open framework structure formed by two parallel sections 82, 83 and two parallel transverse sections 84, 85 forming a polygon. Said four sections define an upper side area. The length of the sections 82, 83 and the transverse sections 84, 85 are such that the support apparatus 80 will fit between the wheel members 25 of the power module 5 and will receive a vehicle tire or wheel between said transverse sections. The lower side of the open frame work structure is supported on a plurality of casters 86 pivotally fixed to the proximate ends of each sections 82, 83. At least two of said casters 86 are locked into a non-swivelling position by a locking means 87 mounted on the sections 82, 83. At least one lateral socket 88 is provided attached to the open frame work 80 with a locking device mounted on said socket. Said socket is adapted to receive a separating member (not shown). The operator of the system may selectively lock at least two of the casters thereby controlling directional stability while maintaining full mobility of the apparatus when mounted between two support apparatus 80 while maintaining said support apparatus in a spaced apart relationship. Such separating member can be a fixed length or a variable length (telescoping). One use of the support apparatus 80 is to locate the apparatus between the wheel members of the power module and then lower a vehicle wheel, which wheel had been lifted by the power module, into the upper side of the support apparatus. Usually the wheel is mounted on a vehicle and if the operator of the system repeated the method of raising the wheel and vehicle with the power module, locating a support apparatus between the wheel member of the power module, then lowering the wheel into the upper side of the support structure for another wheel of said vehicle the vehicle could be maneuvered readily. This same method could be repeated for the remaining wheels of said vehicle and then with all four wheels of the vehicle on the support apparatus of the present invention, an operator could easily maneuver the vehicle in the repair or service facility. The operator could selectively lock a caster to prevent its swivelling by using the locking means provided on the support apparatus, the effect of which would be to control the direction of the vehicle on said support apparatus. The operator could also install the separating member between any tire of said support structures or between all four of said support structures to establish additional stability and maneuvering rigidity.

ADAPTOR PLATE

To increase the versatility of the present invention, an adaptor plate 90 is provided. The adaptor plate 90 is installed on the upper side of said open frame work structure 80 formed by sections 82, 83, 84 and 85. The lower planar surface 94 of the adaptor plate 90 is provided with a first means for retaining 92 which includes a cylinder spring lock 92 and a retaining tang 93. The retaining tang engages section (for instance 83) as the adaptor plate 90 is installed in the open frame work with the cylinder spring lock 92 engaging a section of said open frame work structure 80 opposite (82 in this instance) the retaining tang 93.

The adaptor plate 90 is provided with an opening 97 in the approximate center of said plate with said opening 97 further defined by a tool collar 96 extending through the lower planar surface 94. The tool collar is provided with a second means for retaining 98 which consists of a spring lock. A tool 100 consisting of a mounting column 102 having a plurality of retaining holes 104 and a tool plate attached to one end of said mounting column is installed in the tool collar 96 and retained, at selective positions by the second means for retaining 98 engaging a selected retaining hole 104 in the tool mounting column 102. The tool plate 106 is adapted to support a series of tool units such as a pinch weld clamp 108*a*, a resilient pad 108*b*, a jack saddle (not shown), a fixture support (not shown) and the part holding adaptor 205, described below.

SIDE LIFT MODULE

FIGS. 4, 4*b* and 4*c* illustrate the power module 5 with its tool support plate 22 and the side lift module 130. FIG. 4*b* illustrates the side lift module in a low lift aspect; and FIG. 4*c* shows the side lift module in a high lift aspect. The operator of the system selects from either the high or low lift aspect and establishes such aspect when mounting the side lift module 130 on the tool support plate as shown in FIGS. 4*b* and 4*c*.

The side lift module includes two parallel mounting tubes 134, each such tube being provided with two mounting brackets 132 attached, such as by welding, to the opposite ends of said tube. The mounting brackets 132 are substantially L-shaped with the short length of said shape facing each other. Said mounting brackets 132 engage the tool support plate 22 at the upper and lower edge of said tool support plate and maintain the mounting tubes 134 in parallel contact with the anterior face of the tool support plate. The two mounting tubes are maintained in a spaced apart relationship and at a distance sufficient to provide adequate clearance for mounting the side lift module 130 on the tool support plate 22 by a pair of support wings 138 fixed to both mounting tubes 134 and forming a substantially angled shape with the approximate apex of such angled shape being on a cantilever member 136. Said cantilever member has a proximal end fixed to one of the mounting tubes 134 and a distal end having a through bore adapted to receive a lift plate 140. Such lift plate 140 supports a resilient pad 141 suitable for lifting objects such as a vehicle or the like. The lift plate 140 is pivotable and will engage the through bore of the cantilever member 136 in either the low lift or high lift aspect of the side lift module. The lift plate may be retained in a given position by a retaining pin in a conventional manner.

In operation, an operator will first determine whether to use the side lift module in the high lift or low lift aspect. Then the operator will mount the side lift module 130 on the tool support plate 22 of the power module 5 by engaging the said tool plate with the mounting brackets 132 and sliding the side lift module onto said tool plate until all four mounting brackets 132 are in engagement with said tool plate. Then the operator mounts the lift plate to the cantilever member 136 and orientates said pad to lift a vehicle. The operator then uses the power means 50 of the power module 5 to raise or lower the tool support plate thereby lifting or lowering the side lift module.

It is important to note that when a vehicle to be worked on is mounted on a collision repair rack, such as this applicant's assignee's Pat. No. 4,313,335, conventional lifts or jacks are difficult or impossible to use. With the present inventions side lift module and particularly when using the high lift aspect, an operator can easily engage and lift a vehicle, while such vehicle is on the rack and while the power module 5 is on the floor or support surface of the vehicle repair/service facility.

CRANE MODULE

Figure 5:
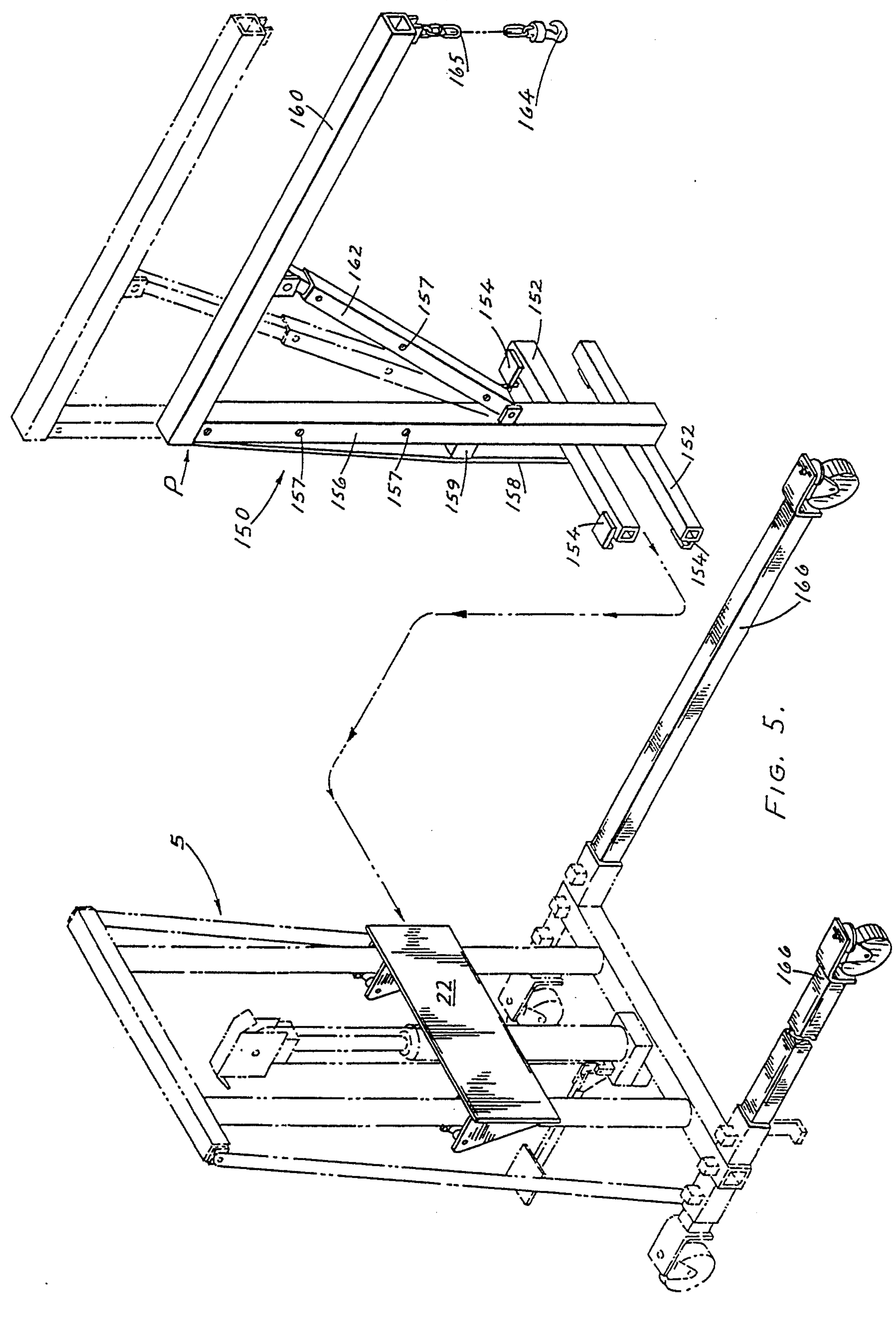
FIG. 5 is an isometric view of the power module and the crane module.

FIG. 5 illustrates the power module 5 with its tool support plate 22 and the crane module 150. FIG. 5 also illustrates, in a phantom line view, the crane module 150 in an extended vertical aspect. The operator of the system with the crane module selects the vertical height of the crane mast, then locks such crane mast height in a conventional manner.

The crane module includes a crane adaptor which includes crane mounting tubes 152, each such tube being provided with two crane mounting brackets 154 attached, such as by welding, to the opposite ends of said tubes. The crane mounting brackets 154 are substantially L-shaped with the short length of said shape facing each other. At least two of said crane mounting brackets 154 engage the tool support plate 22 at the upper edge of such tool support plate and maintain the crane mounting tubes 152 in contact with the anterior face of the tool support plate. The two crane mounting tubes 152 are maintained in a relationship sufficient to provide adequate clearance for mounting the crane module 150 on the said tool support plate by attaching said crane mounting tubes 152 to the crane mast 156.

The crane mast 156 is a tubular member, typically metal, and having an upper portion and a lower portion. The mast is fixed to the two crane mounting tubes 152 at the lower portion of said mast 156 and in a perpendicular aspect. Attached to the mast 156 is a crane boom 160 at the top of the mast as illustrated in FIG. 5. The crane boom 160 is supported by a crane strut 162 attached to the mast and the crane boom. The crane strut may be a fixed length member or a telescoping member as illustrated in FIG. 5. In addition, the crane boom 160 may be pivotally attached to the crane mast 156 at point P by a suitable method well known in the art. If the crane module is provided with a pivoted crane boom, the crane strut may be a hydraulic cylinder and ram assembly having a suitable hydraulic pump device to raise and lower the crane boom. The crane mast 156 and the crane strut 162 may be provided with a plurality of location holes 157 which can be used to fix a selected height of the crane mast by inserting a suitable retaining pin. The crane boom 160 is provided with a flexible linkage 165, such as a chain or cable, and a crane hook 164 at the distal end of the said crane boom. The crane mast 156 is strengthened by a crane mast brace 158, attached to the upper portion of the crane mast and the lower portion of the crane mast and spaced from the crane mast by a mast brace spacer 159. It should be noted that when the crane module 150 is used with the power module 5, the crane wheel member 166 should be used in the two front leg sockets of the power module 5. The crane wheel member 166 is similar to the general purpose wheel member 25 except that the wheel mount 26 is of a sufficient length to place the wheel member 27 beyond the crane hook 164 when the crane boom 160 is at its furthest extension.

MULTIPLE-AXIS MOTION MODULE

FIGS. 8 and 10 illustrates the Multiple-Axis Motion Module 170. The motion module is mounted on the tool support plate 22 of the power module 5 and functions both to hold a tool device/assembly and to provide a means for moving such a tool device/assembly about multiple-axis.

The multiple-axis motion module 170 includes a base plate 171 which has an upper portion 172 and a lower portion 173. The base plate 171 further has a front planar surface 174 and a back planar surface 175. Attached, such as by welding, to the opposite ends of the upper portion 172 of the base plate 171 are two mounting members 176. Each mounting member 176 is an L-shaped with the short portion of said L-shaped piece facing toward the lower portion 173 of the base plate 171. The mounting members 176 engage an edge and the tool support plate 22 of the power module 5. A tang 178 is fixed to the back planar surface 175 of the base plate 171, near the lower portion 173 of said plate, to limit rotation of the multiple-axis motion module about the tool support plate during one motion procedure. The motion module 170 is also provided with a rotating plate 180, notably mounted in the approximate center of the front planar surface 174. Said rotating plate supports a tool mounting collar 182 which collar includes a means for retaining a tool 183. Radial support for the rotating plate 180 is provided by a support roller assembly mounted on the rotating plate 180 near an edge of said rotating plate 180 rotably. Such support roller assembly consists of roller cradle 185 and a roller 184. Said roller 184 is mounted in such cradle and extends through the rotating plate 180 and contacts the front planar surface 174 of the base plate 171. The multiple-axis motion module 170 is also provided with a control block 186 having a threaded through bore, with said control block 186 being pivotally attached to the rotating plate 180 proximate an edge of said rotating plate. A first control rod 188, having a length of screw thread 189, is conveniently mounted on the motion module. In the illustration of the present invention, the joint control rod 188 is mounted to the upper portion 172 of the base plate 171. The screw thread 189 of the joint control rod is threaded into the control block 186 such that as the control rod 188 is turned, either counter-clock wise or clock wise, the control block 186 will move up or down on the control rod 188 thereby pulling or pushing the rotating plate 180 through a total arc of approximately sixty degrees. As can be seen, any tool or device mounted in the tool collar 182 will itself be rotated through the same sixty degrees of rotation, thereby allowing an operator of this system to finely position a vehicle part support by such a tool or device.

The multiple-axis motion module 170 is also provided with a second control rod 190, having a length of screw thread 192, which second control rod is conveniently mounted on the base plate 171. In the illustration of this present invention, the second control rod 190 is mounted on the front planar surface 174 at the lower portion 173 of the base plate 171, with the screw thread extending through the base plate 171 such that the distal end of the second control rod makes contact with the tool support plate 22, through the back planar surface 175 when the multiple-axis motion module 170 is mounted on said tool support plate. The end of the second control rod which contacts the said tool support plate is provided with a suitable bearing surface or assembly to reduce contact friction with said tool support plate. As the second control rod 190 is turned either counter clockwise or clockwise, by the operator of the system, the base plate 1-71 is either pushed or pulled through a total arc of approximately fifteen degrees with respect to the tool support plate 22. Any tool or device mounted in the tool collar 182 will itself be tilted through such fifteen degree arc, thereby allowing an operator of this system to finely position a vehicle part supported by such a tool or device.

In addition to the above described rotation motion and tilt motion, the operator of this system may finely position a vehicle part supported by a tool or device mounted in the said tool collar 182 with an up or down motion by utilizing the power means 50 on the power module 5 to raise or lower the tool support plate 22. As can be seen, motion along or around several axis can be imparted to a tool or device installed in the tool collar of the motion module 170 as selected by the operator of this vehicle and vehicle part transportation system.

PART HOLDER/LOCATOR AND ASSOCIATED MODULES

FIGS. **7*a*, 8, 9 and 10 illustrate the power module 5 having a tool support plate 22 supporting the multiple-axis motion module 170 and showing the several tool modules that can be mounted in the tool mounting collar 182** as selected by the operator of this transportation system.

PART HOLDING ADAPTOR

Referring to FIG. **7*a*, a part holding adaptor 205 which facilitates the use of the specific tool modules with this present invention includes a tubular column 206 having an upper portion 210 and a lower portion 212. The tubular column may be of any convenient cross-section, with a square cross-section being shown in FIG. 7*a*. The tubular column is orientated to have a front face and back face, with a mounting stud 208 attached to the said back face and adapted to engage the tool mounting collar 182 of the multiple-axis motion module 170 and a horizontal tubular socket 214 attached to the front face of said tubular column 206. The part holding adaptor 205 may be provided with additional column height with the operator of the system selectively using an extension column 207 adapted to engage the tubular column 206 at said column's lower portion 212. Said extension column 207 telescopically slides into the tubular column as is maintained at a selected length by a means to prevent telescopic movement 216 mounted on the tubular column. The extention column is provided with a mounting stud 208*a* that engages the tool mounting collar 182. The means for preventing telescopic movement 216 can be of any suitable construction with the illustrated construction being a threaded stud with a knob handle. An alternative construction is shown in FIG. 8 as element 245 which is a threaded stud with a thumb screw handle. It should be noted that any suitable means could be employed to prevent the various member from telescopingly moving. The part holder adaptor 205 is also provided with a second tubular column 232 that telescopically engages the tubular column 206 at its upper portion 210 and maintained in a selected position by a means to prevent telescoping movement 216. Said second tubular column 232 is also provided with an end bracket 234 mounted perpendicularily to the vertical axis of the second tubular column and is provided with a means for preventing telescopic movement 216**.

The end bracket 234 and the horizontal tubular socket 214 are adapted to receive various parts of tools or tool modules, as will be described below. With the part holding adaptor 205 installed in the multiple-axis motion module 170, any tool module mounted on the part holding adaptor 205 can be manipulated to locate and position a vehicle part held or supported in the particular tool module forming a part of this transportation system.

VEHICLE FRAME HORN MODULE

FIG. **7*a* illustrates the vehicle frame horn module 200 mounted on the part holding adaptor 205**. A vehicle typically has pair of frame members that are attached to the vehicle passenger compartment. Such frame members are referred to generally as frame horns. During the attachment procedure, such frame horns must be held in place but because of the length of such frame horns and distance from typical support points and the attachment point, an operator needed assistance. The vehicle horn module 200 of the present invention provides the assistance for such vehicle frame horn installation. The module consists of a frame horn adaptor 218 having a horizontal bar with a perpendicular mounting tang 219 with said tang adapted to engage the horizontal tubular socket 214. The horizontal bar 218 has opposite ends to which are engaged a pair of slide brackets 222 with each bracket having a vehicle frame horn support 220 mounted perpendicularily thereon. The operator slides the said brackets 222 having the said vehicle frame horn supports 220 along the horizontal bar 218 to align said supports with the vehicle frame horns. The frame horns are then supported and can be worked upon by the operator. Additional adjustments can be achieved by the operator working the motion controls of the motion module 170 on the height of the tool support plate 22 on the power module 5.

BUMPER HOLDER MODULE

FIG. 8 illustrates the bumper holder module 230 mounted on the part holding adaptor 205. A vehicle bumper, during the servicing or repair of a vehicle must be supported and positioned. Because different geometrics and materials are involved with vehicles, a tool is needed to accommodate such changing conditions. In the illustrated bumper holder module, the bumper is supported by a bumper adaptor bar 242 having a perpendicular mounting tang 243 which tang is adapted to slidably engage the horizontal tubular socket 214 of the part holding adaptor 205. Mounted on the said bumper adaptor bar 242 are at least two nesting brackets 246. Each nesting bracket 246 consists of stacked tube members attached perpendicularily to each other and each tube member having a means to prevent telescopic movement 245. In each such nesting bracket 246 is slidably mounted a bumper slide bar 244 positioned in a perpendicular aspect to the bumper adaptor bar 242. The bumper module also includes an extended pressure beam 236 engaging the end bracket 234 at one end of the said beam and selectively secured therein by a means to prevent telescopic movement 216 and with the other end of said beam having a pressure rod 238 and pressure pad 240 assembly. Such assembly biases a vehicle bumper against the bumper adapter bar 242 and bumper slide bars 244 during the vehicle servicing operation. Adjustment and positioning motion is provided by the motion module 170 and the tool support plate 22 of the power module, and the positioning of the power module 5.

DOOR HOLDER MODULE

FIG. 9 illustrates the door holder module 250 mounted on the part holding adaptor 205. A vehicle door, during its installation or removal, is heavy and awkward to handle. During such operation fine adjustments must be made to properly position the door hinges with respect to the vehicle body. A tool is needed to provide such fine adjustments during such operations. In the illustrated door holder module 250, the vehicle door is supported by a door holding bracket 258 adapted to engage and support the lower edge of a vehicle door. The door holding bracket 258 has a perpendicular mounting tang 257 adapted to slidably engage the horizontal tubular socket 214 of the part holding adaptor 205. Such door holding module 250 is also provided with a door holding beam 252, which beam engages the end bracket 234 of the part holding adaptor 205 and is selectively secured therein by a means to prevent telescoping movement 216. The other end of said beam is provided with a pivot mount 254 and an adjustable clasp 256 assembly adapted to engage a vehicle door. In operation, the operator of this system places the bottom edge of the vehicle door on the door holding bracket 258 and attaches the adjustable clasp 256 to the portion of the vehicle door adjacent to the door window area or such other convenient area of the door body. The operator then makes the necessary adjustments to the motion module 170 during the positioning of the vehicle door and the vehicle body.

VEHICLE TANK MODULE

FIG. 7*b* illustrates the power module 5 having a tool support plate 22 operatively associated with a multiple-axis motion module 170 and a vehicle tank module 260. In order for an operator to remove a fuel tank from a vehicle, particularily from a modern passenger automobile, it is necessary to use several tools to lift the vehicle, support the fuel tank and remove or install the fuel tank. At times all of the fuel may not be removed from the tank which adds to the weight that has to be handled by the operator. In addition, in most cases, an operator must position himself (herself) under the fuel tank being worked on to perform the necessary work. Existing methods make such fuel tank servicing difficult. Furthermore, present day automobiles have the fuel tank mounted above or in front of the rear wheel axle thereby increasing the difficulty of reaching the fuel tank and servicing it. The vehicle tank module 260 of the present invention provides a tool and method for servicing such fuel tanks.

The vehicle tank module 260 is comprised of a tank beam 262 that has a proximal end 261 and a distal end 263. The proximal end 261 is adapted to engage the tool mounting collar 182 of the multiple-axis motion module 170, which itself is mounted on the tool support plate 22 of the power module 5. The distal end 263 of said beam is provided with a vertical tank beam socket 264 fixed to such end. Because of the length of the tank beam 262 and the typical load of the tool elements and the fuel tank being serviced, the applicant believes that a tubular, circular cross-section is the best mode for practicing this invention with the beam wall being of sufficient thickness to withstand the applicable bending and twisting moments imparted to said beam.

Mounted in the tank beam socket 264 is tank plate 266, which tank plate is free to pivot in said tank beam socket 264. The tank plate 266 has a length of threaded rod 276 threaded through the said plate with such tank height adjusting rod extending through the tank beam socket 264 and terminating with a handle 277. The end of the thread rod extending above the tank plate is terminated with a removable tank disc 274. The tank plate 266 also has a nested framework 268 mounted to it, such as by welding, comprised of a plurality of horizontal tube sockets 269 arranged in stacked, parallel pairs. The horizontal tubes 269 are open at each end and are connected together by a means such as welding to form a substantially square shaped framework. Each horizontal tube socket 269 engages a horizontal bar 270 at selected lengths by telescopingly sliding each horizontal bar in the horizontal tube socket and fixing such bar by a means to prevent telescoping movement 245 such as a thumb screw. (An alternative embodiment is a threaded stud with a knob handle 216). One end of each horizontal bar 270 supports a vertical adjustment socket 272, which socket selectively engages a vertical adjustment bar and maintains such vertical adjustment bar in place by a means to prevent telescoping movement 245.

In operation, the operator of the system will install the vehicle tank holder module 260 or in the tool mounting collar 182 of the motion module 170 while such motion module is supported on the tool support plate 22 of the motion module 5. The operator must install the crane wheel member 166 in the two front leg sockets of the power module 5. After the nesting frame work 268 is aligned with the fuel tank to be serviced, the operator telescopically adjusts the vertical and horizontal adjustment bars 270, 271 to engage the particular fuel tank geometry and fixes those bars positioned with the plurality of means to prevent telescoping movement 245. The tank disc 274 is then raised by turning the tank height adjustment rod 276 and handle 277 to slightly lift the fuel tank. This slight lifting allows the operator to disengage the fuel tank securing means. Then the operator lowers the fuel tank back into the nesting framework and wheels the power module with the fuel tank secured in the nesting framework out from the vehicle. Installation of the fuel tank is the reverse of the above described method.

Thus it should be apparent that there has been provided in accordance with the present invention a vehicle and vehicle part transportation system comprising a power module with a tool support plate and a selectively mounted multiple-axis motion module all operatively associated with a plurality of tool modules/assemblies and a method for using such modules to repair and service vehicles that satisfies the objectives and advantages set forth above. Although the invention has been described in conjunction with specific embodiments thereof, it is evident that many alternatives, modifications and variations will be apparent to those ordinarily skilled in the art. Accordingly, it is intended to embrace all such alternatives, modifications and variations that fall within the spirit and scope of the appended claims.

We claim:

1. A vehicle transportation system for moving, positioning, and manipulating vehicles and vehicle parts, said system comprising:
   - a lifting device including a tool support plate; and
   - a multiple axis motion module, said motion module comprising:
     - a base plate having a front and back planar surface and an upper portion and a lower portion,
     - a mounting member attached to the upper portion of the base plate for mounting the base plate to the tool support plate,
     - a tang attached to the lower portion of the base plate for limiting rotation of the base plate,
     - a rotating plate pivotally mounted on the front surface of the base plate and having a tool mounting collar with said rotating plate further having a support roller mounted adjacent to an edge of the rotating plate with said roller contacting the front planar surface of the base plate,
     - a control block pivotally mounted on the rotating plate proximate the edge of said plate with said control block having a threaded through bore,
     - a first control rod having a length of screw thread, said rod being mounted on the base plate and being threadedly engaged with the threaded through bore of the control block, and
     - a second control rod having a length of screw thread, threadedly mounted on the base plate and in contact with the tool support plate.

2. The multiple-axis motion module of claim 1 wherein the tool mounting collar includes a means for retaining a tool.

3. The multiple-axis motion module of claim 1 wherein the first control rod limits the movement of the rotating plate through a total arc of sixty degrees about the mounting pivot of said rotating plate.

4. The multiple-axis motion module of claim 1 wherein the second control rod limits the movement of the motion module with respect to the tool support plate to a total arc of fifteen degrees.

* * * * *